(12) United States Patent
Attassery et al.

(10) Patent No.: US 7,708,147 B2
(45) Date of Patent: May 4, 2010

(54) FLUID FILTER ASSEMBLY WITH NOTCHED CASE

(75) Inventors: Nishaj Attassery, Fayetteville, NC (US); Bruce Murray Roxburgh, Fayetteville, NC (US); Lorne Burry, Fayetteville, NC (US)

(73) Assignee: Purolator Filters NA LLC, Fayetteville, NC (US)

( * ) Notice: Subject to any disclaimer, the term of this patent is extended or adjusted under 35 U.S.C. 154(b) by 510 days.

(21) Appl. No.: 10/989,210

(22) Filed: Nov. 15, 2004

(65) Prior Publication Data

US 2006/0102548 A1    May 18, 2006

(51) Int. Cl.
   *B01D 35/30* (2006.01)
(52) U.S. Cl. .............. 210/433.1; 210/450; 210/451; 210/455; 210/440; 210/437
(58) Field of Classification Search ............. 210/455, 210/451, 433.1, 450
See application file for complete search history.

(56) References Cited

U.S. PATENT DOCUMENTS

| | | | |
|---|---|---|---|
| 2,185,281 A | 1/1940 | Tear | |
| 2,197,252 A | 4/1940 | Decker | |
| 2,547,857 A | 4/1951 | Cook | |
| 2,578,020 A | 12/1951 | Sanberg | |
| 2,654,483 A | 10/1953 | Ahlijian | |
| 3,268,077 A | 8/1966 | Ball | |
| 3,272,336 A | 9/1966 | Humbert, Jr. | |
| 3,388,800 A | 6/1968 | MacGregor | |
| 3,397,786 A | 8/1968 | Hultgren | |
| 3,640,390 A | 2/1972 | Goy et al. | |
| 3,724,665 A | 4/1973 | Hall | |
| 4,169,058 A * | 9/1979 | Pickett et al. | 210/440 |
| 4,256,579 A | 3/1981 | Rose et al. | |
| 4,497,706 A * | 2/1985 | Pickett et al. | 210/130 |
| 4,676,895 A | 6/1987 | Davis | |
| 4,783,271 A | 11/1988 | Silverwater | |
| 4,906,365 A | 3/1990 | Baumann et al. | |
| 4,948,503 A | 8/1990 | Baumann et al. | |
| 5,024,761 A | 6/1991 | Deibel | |
| 5,374,355 A | 12/1994 | Habiger et al. | |
| 5,413,712 A | 5/1995 | Gewiss et al. | |
| 5,468,386 A | 11/1995 | Ardes | |
| 5,538,626 A | 7/1996 | Baumann | |
| 5,556,542 A | 9/1996 | Berman et al. | |
| 5,589,060 A * | 12/1996 | Gebert et al. | 210/130 |

(Continued)

FOREIGN PATENT DOCUMENTS

CA    2157421    3/1996

(Continued)

OTHER PUBLICATIONS

European search report dated Mar. 23, 2006 (5 pages).

(Continued)

*Primary Examiner*—Walter D Griffin
*Assistant Examiner*—Denise R Anderson
(74) *Attorney, Agent, or Firm*—Crowell & Moring LLP

(57) ABSTRACT

A fluid filter assembly comprises a filter and a case. The case defines a filter chamber receiving the filter. The case comprises a notch extending into the filter chamber and engaging the filter.

18 Claims, 4 Drawing Sheets

U.S. PATENT DOCUMENTS

| | | | |
|---|---|---|---|
| 5,695,633 | A | 12/1997 | Ernst et al. |
| 5,698,097 | A | 12/1997 | Gebert et al. |
| 5,702,602 | A | 12/1997 | Brown et al. |
| 5,762,788 | A | 6/1998 | Gullett |
| 5,770,054 | A | 6/1998 | Ardes |
| 5,770,065 | A | 6/1998 | Popoff et al. |
| 5,779,903 | A * | 7/1998 | Smith et al. ............... 210/440 |
| 5,814,215 | A | 9/1998 | Bruss et al. |
| 5,846,416 | A | 12/1998 | Gullett |
| 5,902,479 | A | 5/1999 | Fukumori et al. |
| 5,928,511 | A | 7/1999 | Messner et al. |
| 5,984,109 | A | 11/1999 | Kanwar et al. |
| 5,989,413 | A | 11/1999 | Jauss et al. |
| 6,006,924 | A | 12/1999 | Sandford |
| 6,015,492 | A | 1/2000 | Popoff et al. |
| 6,068,763 | A | 5/2000 | Goddard |
| 6,217,755 | B1 | 4/2001 | Stifelman et al. |
| 6,251,273 | B1 | 6/2001 | Jawurek et al. |
| 6,423,222 | B1 * | 7/2002 | Shively et al. .............. 210/232 |
| 6,428,700 | B1 * | 8/2002 | Brown et al. ............. 210/380.1 |
| 6,544,412 | B2 * | 4/2003 | Michels et al. ............. 210/130 |
| 6,555,000 | B2 * | 4/2003 | Knight ................... 210/416.4 |
| 6,572,768 | B1 * | 6/2003 | Cline et al. ................. 210/236 |
| 6,595,372 | B1 * | 7/2003 | Minowa et al. ............ 210/440 |
| 6,607,665 | B2 * | 8/2003 | Fick et al. .................. 210/238 |
| 6,627,078 | B1 | 9/2003 | Wagner |
| 6,706,181 | B1 | 3/2004 | Baumann |
| 2002/0170279 | A1 * | 11/2002 | Gustafson et al. ............. 55/510 |
| 2003/0010689 | A1 | 1/2003 | Yano |
| 2003/0226790 | A1 * | 12/2003 | Brown et al. .................. 210/90 |
| 2005/0178715 | A1 * | 8/2005 | Thomas et al. .............. 210/437 |

FOREIGN PATENT DOCUMENTS

| | | |
|---|---|---|
| DE | 35 38 589 A1 | 5/1987 |
| DE | 39 03 675 A1 | 8/1990 |
| DE | 42 40 656 A1 | 7/1993 |
| DE | 43 31 598 A1 | 3/1995 |
| DE | 195 38 883 A1 | 4/1997 |
| DE | 298 15 023 U1 | 11/1998 |
| DE | 298 15 023 U 1 | 11/1998 |
| DE | 199 35 504 A1 | 2/2001 |
| DE | 199 51 085 A1 | 4/2001 |
| EP | 0 346 692 A1 | 12/1989 |
| EP | 0 701 059 A2 | 3/1996 |
| EP | 1 285 683 A1 | 2/2003 |
| GB | 2 162 079 A | 1/1986 |
| GB | 2 162 079 A | 1/1986 |
| JP | 2002191909 A | 7/2002 |
| WO | WO 97/48470 | 12/1997 |
| WO | WO 01/12294 A1 | 2/2001 |
| WO | WO 01/30480 A1 | 5/2001 |
| WO | WO02/100511 * | 12/2002 |

OTHER PUBLICATIONS

Communication from European Patent Office dated Mar. 9, 2007 (1 page).

* cited by examiner

FLUID FILTER ASSEMBLY WITH NOTCHED CASE

FIELD OF THE DISCLOSURE

The present disclosure relates generally to a fluid filter assembly.

BACKGROUND OF THE DISCLOSURE

Fluid filter assemblies are used to filter fluids. Fluids which may be filtered by fluid filter assemblies include, for example, oil, hydraulic fluid, and transmission fluid, to name just a few.

SUMMARY OF THE DISCLOSURE

According to an aspect of the present disclosure, there is provided a fluid filter assembly. The fluid filter assembly comprises a filter, a filter support, and a case to which the filter support is secured and that defines a filter chamber receiving the filter. The case comprises a notch extending into the filter chamber and urging the filter against a filter support. In one example, there are a plurality of such notches formed in an end wall of the case but not in a sleeve of the case. In another example, the plurality of notches are formed in both the end wall and the sleeve.

The above and other features of the present disclosure will become apparent from the following description and the attached drawings.

BRIEF DESCRIPTION OF THE DRAWINGS

The detailed description particularly refers to the following figures in which.

DETAILED DESCRIPTION OF THE DRAWINGS

Figure 1:
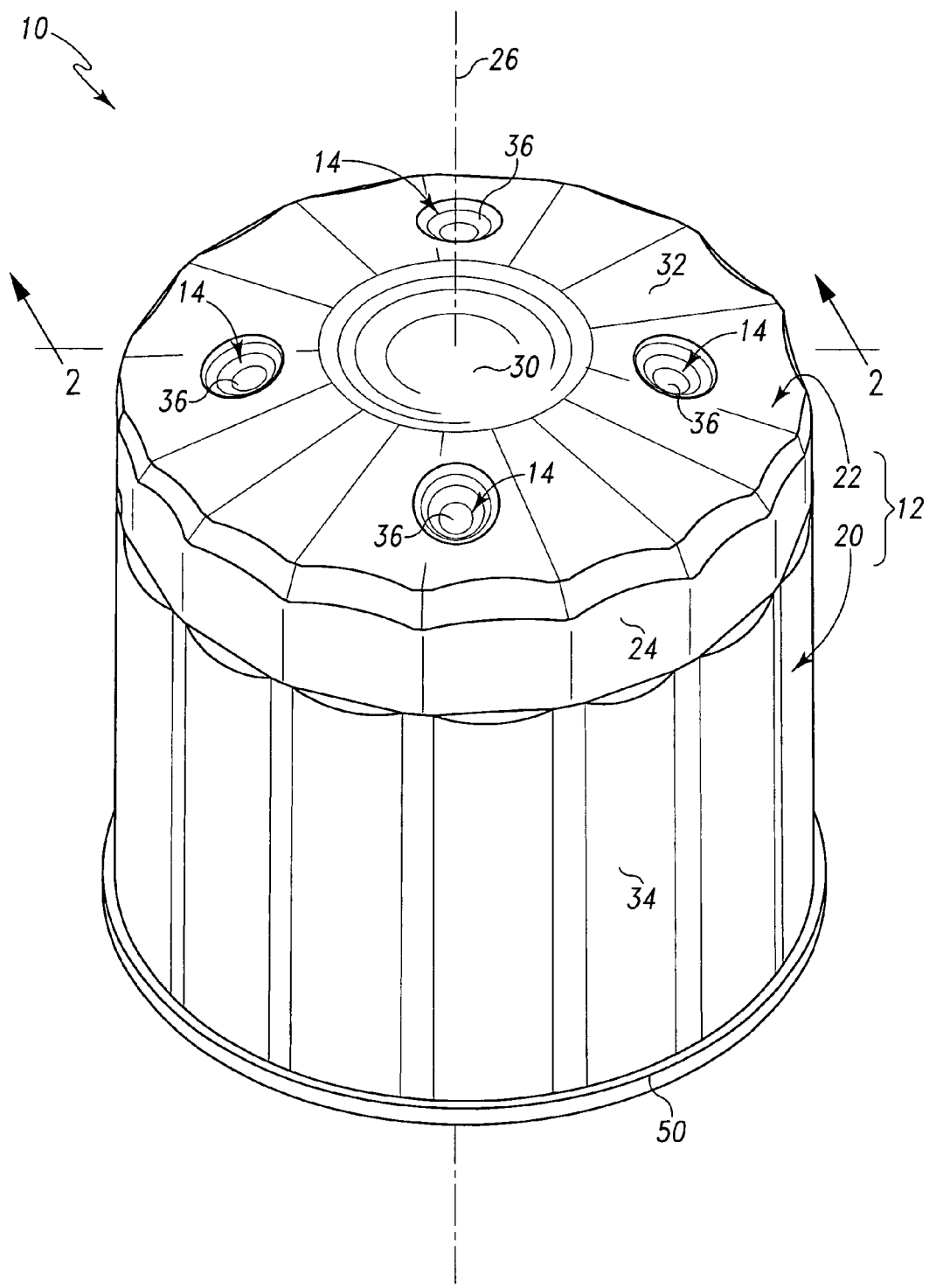
FIG. 1 is a perspective view of a fluid filter assembly that has a number of notches formed in an end wall of a case of the fluid filter assembly.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

Figure 2:
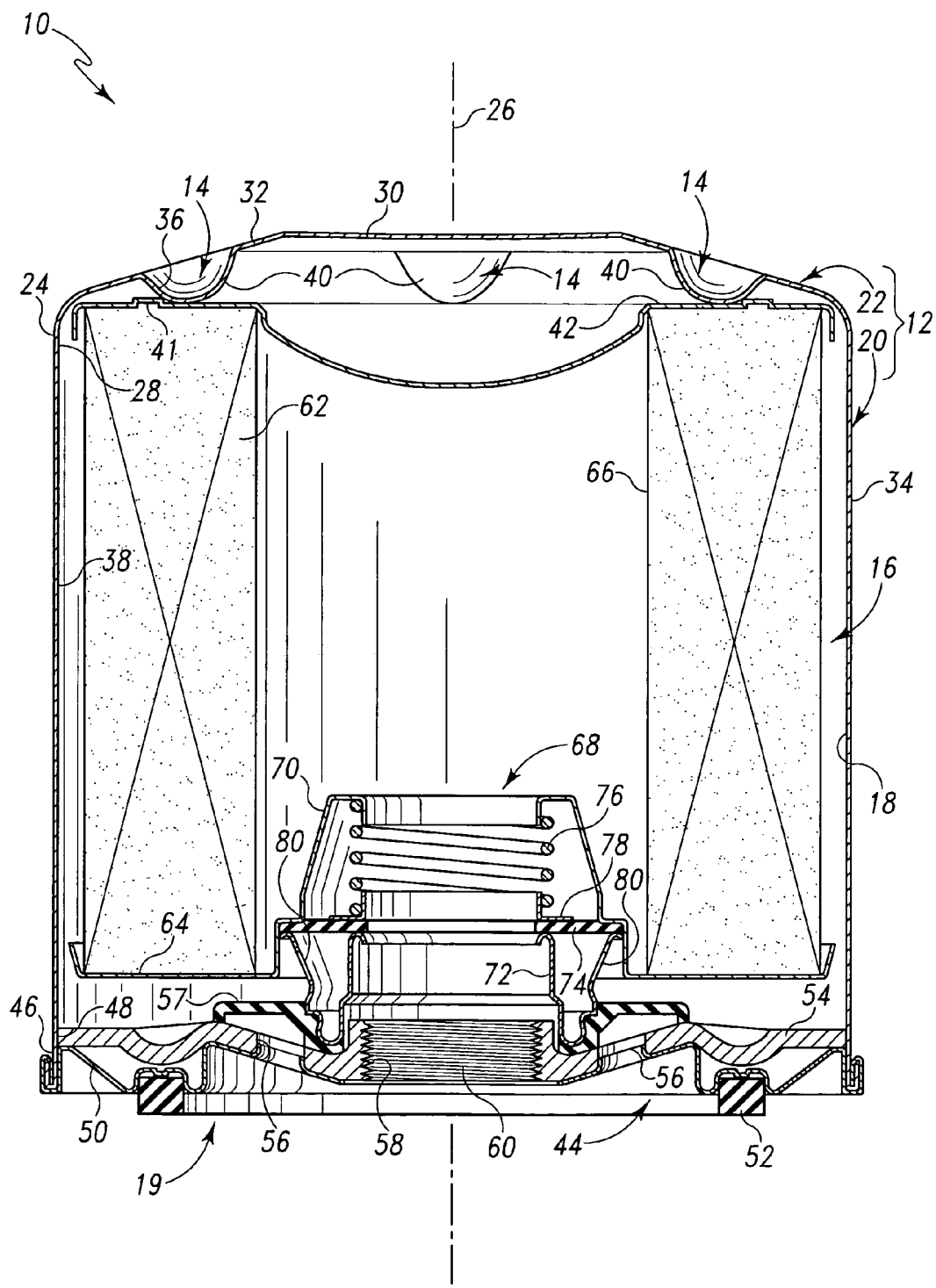
FIG. 2 is sectional view taken along lines 2-2 of FIG. 1 showing use of the notches formed in the end wall to urge a filter against a filter support secured to the case.

Referring to FIGS. 1 and 2, there is provided a fluid filter assembly 10 which is configured to filter a fluid such as oil. The filter assembly 10 has a case 12 which comprises a number (e.g., four) of notches 14. The notches 14 serve two purposes. First, they provide gripping points to facilitate installation and removal of the filter assembly 10 onto and from a fluid user (not shown) such as an internal combustion engine. Second, they act as standoffs to position a filter 16 of the assembly 10 in a filter chamber 18 and against a filter support 19 secured to the case 12.

The case 12 is a one-piece member comprising a sleeve 20 and an end wall 22. Together, the sleeve 20 and the end wall 22 define the filter chamber 18 containing the filter 16. The end wall 22 is secured to a sleeve first end 24 and extends radially inwardly therefrom relative to a central axis 26 of the assembly 10 to cover a first aperture 28 defined by sleeve first end 24. The end wall 22 comprises a central flat portion 30 and a radially outer frusto-conical portion 32. Frusto-conical portion 32 extends radially outwardly from the flat portion 30 to the sleeve first end 24 as the frusto-conical portion 32 extends axially along axis 26.

Notches 14 are formed in the frusto-conical portion 32 and are spaced evenly about the axis 26. Each notch 14 provides an external surface 34 of the case 12 with a recessed gripping surface 36 to receive, for example, a finger of a person installing or removing the filter assembly 10. Each notch 14 also provides an internal surface 38 of the case 12 with a protruding surface 40 that engages an annular rib 41 of a first end cap 42 of the filter 16. As such, notches 14 extend inwardly into the filter chamber 18 to engage the first end cap 42 and thereby urge the filter 16 against the filter support 19 to secure the filter 16 in the filter chamber 18.

The filter support 19 comprises a closure 44 secured to a sleeve second end 46 opposite to the sleeve first end 24 to close a second aperture 48 defined by the sleeve second end 46. Together, closure 44 and case 20 provide the housing of filter assembly 10.

Closure 44 comprises a retainer plate 50, a gasket 52, and a connector plate 54. The retainer plate 50 is crimped to the sleeve second end 46 to secure closure 44 thereto. The gasket 52 is secured to the retainer plate 50 and configured to seal against the fluid user. The connector plate 54 is secured to the retainer plate 50 and cooperates with the retainer plate 50 to define a number of inlet apertures 56 spaced about axis 26 and configured to admit unfiltered fluid from the fluid user into the filter chamber 18. An anti-drainback, flapper inlet valve 57 is arranged to block fluid admitted into the filter chamber 18 from draining from the filter chamber 18 through the inlet apertures 56. The connector plate 54 comprises internal threads 58 configured to thread against external threads of an outlet post of the fluid user to mount the filter assembly 10 to the fluid user. The threads 58 thus define a fluid outlet aperture 60 through which fluid filtered by filter 16 is discharged from the filter chamber 18 back to the fluid user.

Filter 16 comprises a cylindrical filter medium 62 and first and second end caps 42, 64 secured to opposite ends of the filter medium 62. Normally, fluid that enters the filter chamber 18 through inlet apertures 56 is filtered by filter medium 62 when it flows radially inwardly through the filter medium 62 into an interior filtered fluid region 66 defined in the filter medium 62. After filtration by filter medium 62, the filtered fluid flows from the region 66 through a bypass assembly 68 and is discharged from the filter chamber 18 through the outlet aperture 60.

The bypass assembly 68 is configured to allow fluid to bypass filter 16 when the fluid is relatively thick during, for example, a cold-start situation or when flow through the filter medium 62 is obstructed by contaminants collected by the filter medium 62. The bypass assembly 68 comprises a first bypass plate 70 which is included in the second end cap 64, a second bypass plate 72, an annular bypass valve 74, a return spring 76, and a spring plate 78. The bypass plates 70, 72 cooperate to hold a radially outer portion of the bypass valve 74 therebetween and the bypass plate 72 and the connector plate 54 cooperate to hold a radially inner portion of the inlet valve 57 therebetween as a result of the notches engaging the first end cap 42 and thereby urging the filter 16 toward the closure 44. The closure 44, the inlet valve 57, and the bypass assembly 68 cooperate to provide the filter support 19.

The spring 76 acts against the first bypass plate 70 and the spring plate 78 to urge a radially inner portion of the bypass valve 74 toward the second bypass plate 72 to normally block fluid from bypassing the filter 16. When there is a sufficient build-up of fluid pressure in the filter chamber, fluid flows through bypass apertures 80 formed in bypass plate 72 and unseats bypass valve 74 from plate 72 to discharge through outlet aperture 60 without flowing through the filter medium 62.

Engagement between the notches 14 and the first end cap 42 thus urge the filter 16 against the filter support 19. In particular, such engagement urges the filter 16 against components of the bypass assembly 68 which cooperates with the closure 44 and the inlet valve 57 to provide the filter support 19. The filter 16 is thereby retained in the filter chamber 18. Further, components of the bypass assembly 68 and the inlet valve 57 are retained in the filter chamber 18 between the filter 16 and the closure 44 as a result of engagement between the notches 14 and the first end cap 42.

Figure 3:
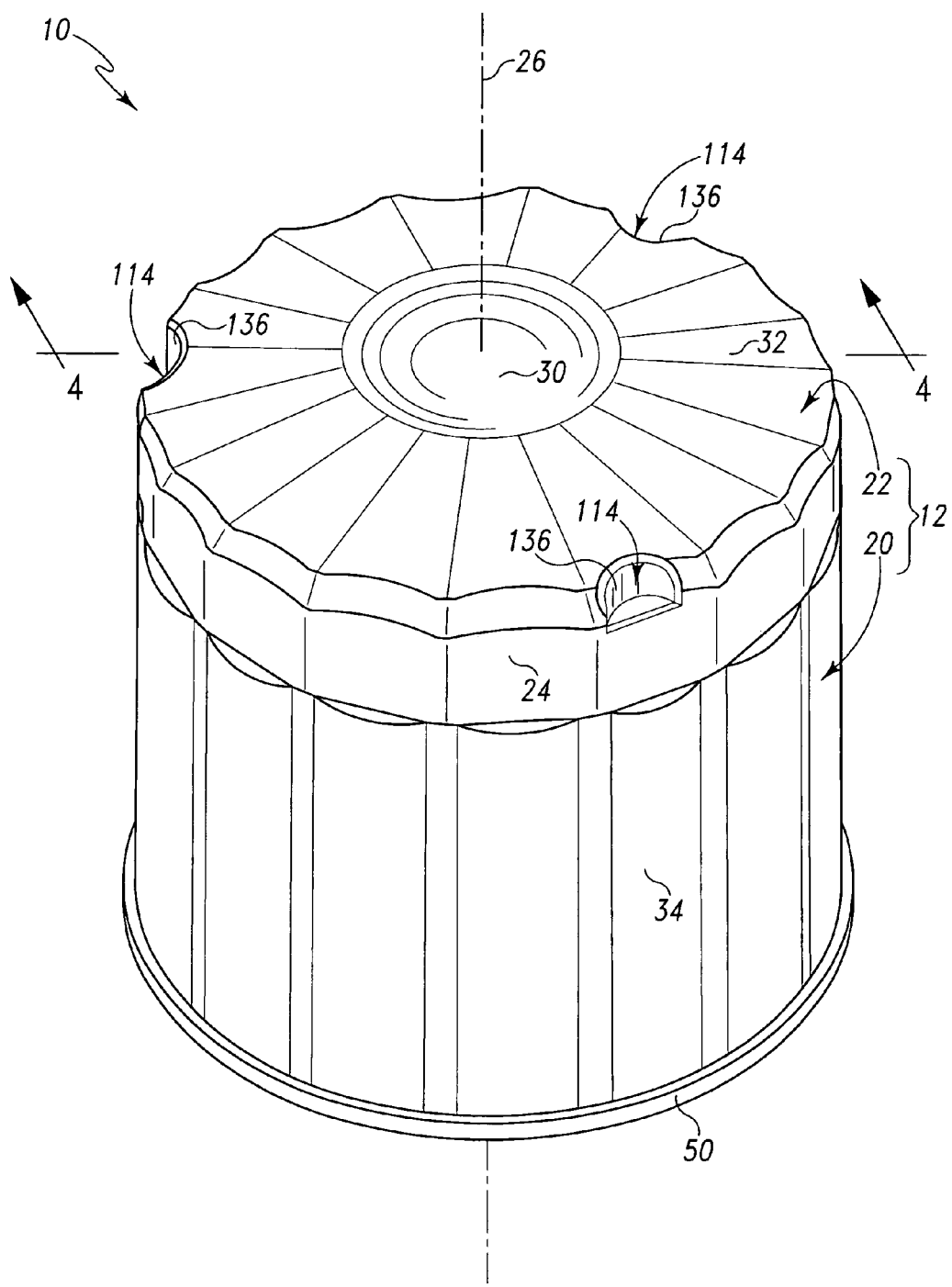
FIG. 3 is a perspective view of the fluid filter assembly showing notches formed in the end wall and a sleeve of the case along a junction between the end wall and the sleeve.
Figure 4:
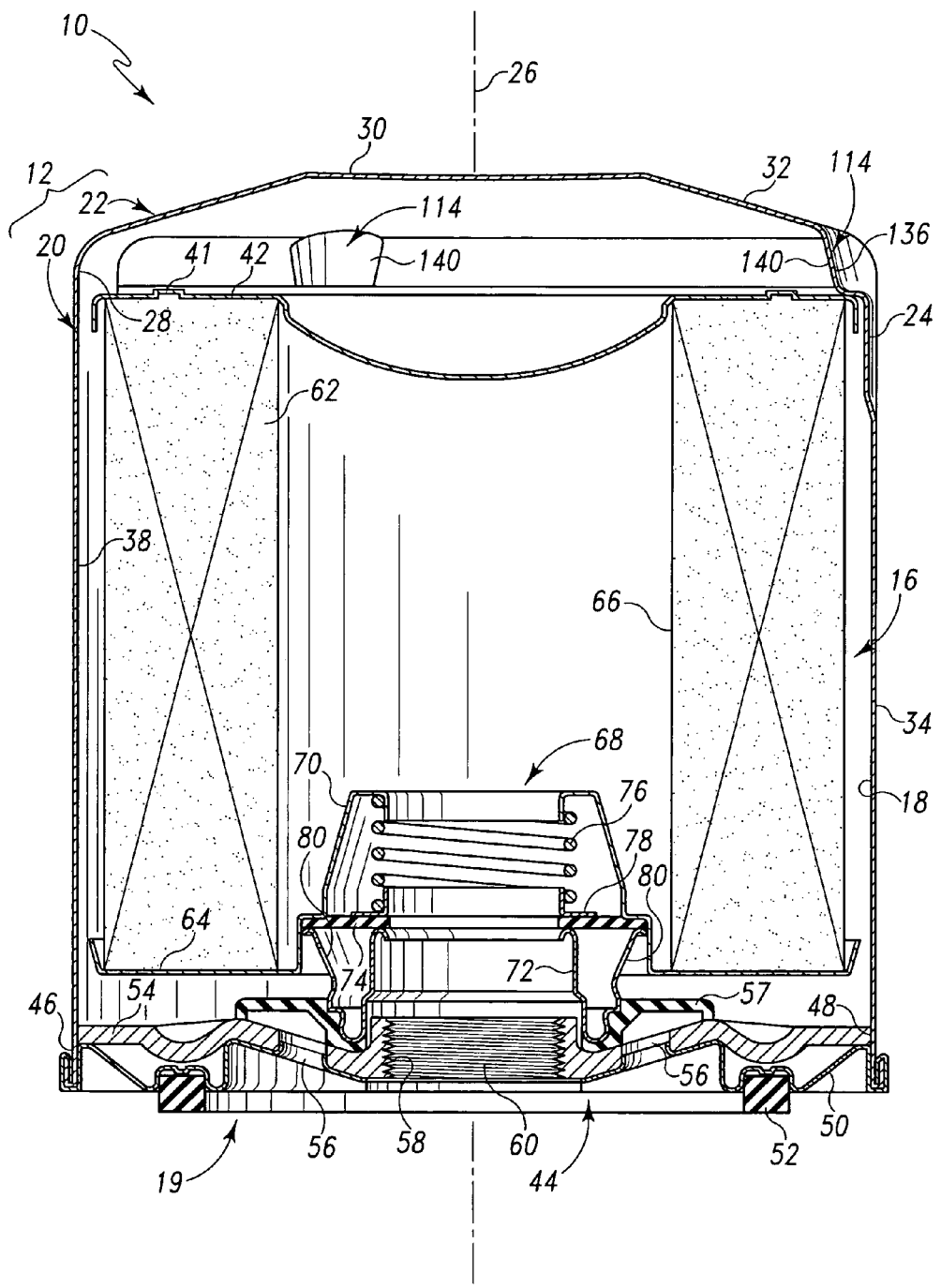
FIG. 4 is sectional view taken along lines 4-4 of FIG. 3 showing use of the notches formed in the end wall and the sleeve to urge the filter against the filter support.

Referring to FIGS. 3 and 4, the case 12 may have a number (e.g., three) of notches 114 which are spaced evenly about the axis 26 and which are formed in the sleeve 20 and the end wall 22 along a junction therebetween. In such a situation, each notch 114 provides the external surface 34 of case 12 with a recessed gripping surface 136 to facilitate installation and removal of the filter assembly 10 and provides the internal surface 38 of the case 12 with a protruding surface 140 that engages a radially outer portion of the first end cap 42 to urge the filter 16 against the filter support 19.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the apparatus, method, and system described herein. It will be noted that alternative embodiments of the present disclosure may not include all of the features described yet still benefit from at least some of the advantages of such features. Those of ordinary skill in the art may readily devise their own implementations of an apparatus, method, and system that incorporate one or more of the features of the present disclosure and fall within the spirit and scope of the present invention as defined by the appended claims.

The invention claimed is:

1. A fluid filter assembly, comprising:
a filter,
a filter support, and
a case to which the filter support is secured and that defines a filter chamber receiving the filter, the case comprising a notch extending into the filter chamber and urging the filter against the filter support, wherein the filter includes a first end cap, and said notch engages a rib on said first end cap,
wherein the notch provides an external surface of the case with a recessed gripping surface adapted to be gripped to facilitate installation and removal of the fluid filter assembly.

2. The fluid filter assembly of claim 1, wherein:
the case comprises a sleeve and an end wall that is secured to and extends radially inwardly relative to the sleeve, and
the notch is formed in the end wall.

3. The fluid filter assembly of claim 1, wherein:
the case comprises a sleeve and an end wall that is secured to and extends radially inwardly relative to the sleeve, and
the notch is formed in the sleeve and the end wall along a junction between the sleeve and the end wall.

4. The fluid filter assembly of claim 1, wherein the case comprises a plurality of notches extending into the filter chamber and urging the filter against the filter support.

5. The fluid filter assembly of claim 4, wherein:
the case has a central axis, and
the plurality of notches are spaced evenly about the central axis.

6. The fluid filter assembly of claim 1, wherein:
the filter comprises a second end cap.

7. The fluid filter assembly of claim 6, wherein:
the second end cap cooperates with the filter support to provide a bypass assembly for allowing fluid to bypass the filter,
the bypass assembly comprises a bypass valve, and
engagement between the notch and the first end cap urges the second end cap against the bypass valve.

8. The fluid filter assembly of claim 1, wherein said rib is annular.

9. The fluid filter assembly of claim 1, wherein:
the case comprises an end wall comprising a central flat portion and a radially outer frusto-conical portion tapering radially outwardly as the frusto-conical portion extends axially from the flat portion, and
the notch is formed in the tapered portion.

10. A fluid filter assembly, comprising:
a filter having a first end cap, and
a case defining a filter chamber receiving the filter, the case comprising a notch extending into the filter chamber and engaging a rib on said first end cap,
wherein the notch provides an external surface of the case with a recessed gripping surface adapted to be gripped to facilitate installation and removal of the fluid filter assembly.

11. The fluid filter assembly of claim 10, wherein:
the filter comprises a second end cap.

12. The fluid filter assembly of claim 10, wherein:
the case comprises a sleeve and an end wall secured to and extending radially inwardly from an end of the sleeve, and
the notch is formed in the sleeve.

13. The fluid filter assembly of claim 10, wherein:
the case comprises a sleeve and an end wall secured to and extending radially inwardly from an end of the sleeve, and
the notch is formed in the end wall.

14. The fluid filter assembly of claim 10, wherein:
the case comprises a sleeve and an end wall secured to and extending radially inwardly from an end of the sleeve, and
the notch is formed in the sleeve and the end wall.

15. The fluid filter assembly of claim 11, wherein:
the case defines an aperture that opens into the filter chamber and is closed by a closure of the fluid filter assembly, and the notch is one of a plurality of notches extending into the filter chamber and engaging the first end cap so as to urge the second end cap toward the closure and against a bypass valve.

16. A fluid filter assembly, comprising:
a filter,
a filter support, and
a one-piece case comprising a sleeve and an end wall that cooperates with the sleeve to define a filter chamber receiving the filter, the sleeve comprising a sleeve first end and a sleeve second end opposite to the sleeve first end, the end wall being secured to and extending radially inwardly from the sleeve first end to cover a first aperture defined by the sleeve first end, the filter support being secured to the sleeve second end to close a second aperture defined by the sleeve second end, at least one of the sleeve and the end wall comprising a plurality of notches extending into the filter chamber and engaging a rib on an end cap of the filter so as to urge the filter against the filter support.

17. The fluid filter assembly of claim 16, wherein the notches are formed in the end wall but not the sleeve.

18. The fluid filter assembly of claim 16, wherein the notches are formed in the end wall and the sleeve.

* * * * *